(12) United States Patent
Chattot (10) Patent No.: US 8,615,869 B2
(45) Date of Patent: Dec. 31, 2013

(54) SYSTEM FOR ASSEMBLING ELECTRICAL ENERGY MODULES

(75) Inventor: Eric Chattot, Meudon (FR)

(73) Assignee: Siemens SAS, St. Denis (FR)

( * ) Notice: Subject to any disclaimer, the term of this patent is extended or adjusted under 35 U.S.C. 154(b) by 263 days.

(21) Appl. No.: 13/131,986

(22) PCT Filed: Nov. 28, 2008

(86) PCT No.: PCT/FR2008/001662
§ 371 (c)(1),
(2), (4) Date: Aug. 10, 2011

(87) PCT Pub. No.: WO2010/061063
PCT Pub. Date: Jun. 3, 2010

(65) Prior Publication Data
US 2011/0302773 A1 Dec. 15, 2011

(51) Int. Cl.
*B23P 19/00* (2006.01)
*H01R 43/20* (2006.01)

(52) U.S. Cl.
USPC ................. 29/747; 29/729; 29/730; 429/123; 429/145; 429/158

(58) Field of Classification Search
USPC ........... 29/747, 623.1, 729–731; 429/62, 100, 429/123, 145, 158
See application file for complete search history.

(56) References Cited

U.S. PATENT DOCUMENTS

| | | | |
|---|---|---|---|
| 3,836,401 A | 9/1974 | Niklas et al. | |
| 5,140,744 A * | 8/1992 | Miller | 29/730 |
| 5,496,657 A * | 3/1996 | Dixon, Jr. | 429/62 |
| 5,765,671 A | 6/1998 | Endo et al. | |
| 5,906,899 A | 5/1999 | Noda et al. | |
| 6,296,968 B1 | 10/2001 | Verhoog | |
| 6,498,762 B2 | 12/2002 | Horiuchi et al. | |
| 2006/0246773 A1 | 11/2006 | Yoon et al. | |
| 2010/0119929 A1 | 5/2010 | Gaben et al. | |

FOREIGN PATENT DOCUMENTS

| | | |
|---|---|---|
| CN | 101138109 A | 3/2008 |
| EP | 0 700 805 A2 | 3/1996 |
| EP | 0 789 411 A1 | 8/1997 |
| EP | 0964460 A1 | 12/1999 |
| FR | 2 789 231 A1 | 8/2000 |
| FR | 2 832 856 A1 | 5/2003 |
| FR | 2 915 320 A1 | 10/2008 |
| WO | 02/095843 A2 | 11/2002 |

\* cited by examiner

*Primary Examiner* — Thiem Phan
(74) *Attorney, Agent, or Firm* — Laurence A. Greenberg; Werner H. Stemer; Ralph E. Locher (57) ABSTRACT

A system of assembling storage devices in the form of electrical energy modules includes two pairs of positive and negative terminals for each module, in which each of the pairs of positive and negative terminals is distributed over at least one of the external faces of each module, thus forming a terminal strip of the module. At least one interconnection block can be inserted onto part of each of the terminal strips of two separate modules and itself includes at least two pairs of anchoring points so as to form an assembly block, either by stacking the storage modules or by juxtaposing the same. At least two anchoring points of each interconnection block are in electrical contact, while stiffening the assembly, in a manner complementary to the other anchoring points.

27 Claims, 6 Drawing Sheets

SYSTEM FOR ASSEMBLING ELECTRICAL ENERGY MODULES

BACKGROUND OF THE INVENTION

Field of the Invention

The present invention relates to a system for assembling modular means of storing electrical energy, each of them in particular having two pairs of positive and negative terminals.

The storage means are typically made up of several primary elements assembled in series and/or parallel in the form of a module and have internal means of connection to at least one pair of positive terminals and one pair of negative terminals on an external face of the module.

The present invention thus relates to a system for assembling electrical energy storage means in the form of modules, each of them in particular having at least two pairs of terminals with positive and negative connections on one or more external faces of the module thus constituting a terminal strip integrated with at least one of the modules, said assembly providing for assembly of said modules in series or in parallel.

Without restriction, the present invention is intended in particular for electrical energy storage means such as electrochemical super-capacitors or batteries which can be carried in a vehicle. For mass transport vehicles (bus, trolleybus, tramway, metro, train, etc.), such storage means may for example be arranged in the chassis part of the vehicle or in the vehicle roof, typically, where electrical connections (for coupling in series or in parallel) between the storage means are made by means of cables, strips or braids electrically linking the terminals together.

In the present invention, each module has in particular at least one pair of positive terminals and one pair of negative terminals, which, for a single module, are linked electrically according to their respective polarity (the "+" with the "+" and the "−" with the "−"). These terminals are arranged on a terminal strip integrated with the module on the external front of the module.

The present invention also relates to a device for cooling said energy storage modules, the latter possibly being subject to severe heating (high currents) in railway applications.

Similar arrangements are for example described by U.S. Pat. No. 5,510,207 and EP 0964460B1. Here too, these arrangements have disadvantages in assembly and dismantling of the batteries, since they have a large number of separate cooling liquid circulation inlets and outlets. The cooling circuits and their inlets and outlets may also constitute an assembly structure requiring complex means of sealing (structural part of the battery or module or by means of numerous external pipes).

BRIEF SUMMARY OF THE INVENTION

A particular object of the present invention is thus to provide a system for assembling electrical energy storage means in the form of modules, each of them having in particular at least one pair of positive and negative terminals, wherein it is imperative to simplify the series or parallel connections between said modules. In this respect, this includes safeguarding and enhancing the quality of the connections and effectively protecting the modules against overcurrents and other environmental interference as well as facilitating the monitoring of vital parameters (such as voltage, temperature and current) and finally facilitating the assembly or replacement of modules.

Another object of the present invention is, using the assembly system mentioned previously, to be able easily to integrate a cooling device for the energy storage means, while guaranteeing its simplicity and robust assembly as well as the required conditions mentioned above.

Using a system for assembling modules as an electrical energy storage means, such as batteries or super-capacitors, each of them having at least one pair of positive and negative terminals, said system according to the invention provides that:

each of said pairs of positive and negative terminals is distributed on one of the external faces of each module, thus forming a terminal strip of said module, each said module being parallelepiped in shape, at least one interconnection block (I1, I2) can be inserted on a part of each of the terminals of two separate modules and itself comprises at least two pairs of anchoring points (A1, A2; A3, A4) so as to form an assembly block, either by stacking or by juxtaposition between said storage modules (M1, M2), at least two anchoring points of each interconnection block are in electrical contact while stiffening the assembly, in a manner complementary to the other anchoring points.

In other words, it is possible to link the mechanical anchoring points with a concept of the electrical "terminal strip" type, so that:

each of the positive and negative connection terminals is distributed over one or more external faces of the module, thus constituting a terminal strip integrated with said module, at least one interconnection block (I1, I2) can be plugged between two terminal strips of different juxtaposed or stacked modules and itself comprises at least two terminals which can be plugged into the terminal strip of said modules so as to form, by stacking or juxtaposition, a block of the module-block-module type which can be integrated electrically and mechanically, at least one of the terminals of the interconnection block between two modules is in electrical contact with one of the terminals of each module.

Multiple advantages are thus obtained by such stacking or juxtaposition:

stacking or juxtaposition is applicable for energy storage modules of different sizes and shapes, stacking or juxtaposition is modular and easily adaptable to variable power requirements, the assembly system is based on a principle of plugging the linking blocks with concomitant faces and thus makes it possible to eliminate almost all cables (external to the assembly modules) and thus represents a gain in volume or in weight with respect to a traditional cabled solution, through the modularity of the stacking, the quality of the connections is thus made reliable and improved by consequent protection of the contacts against environmental interference during assembly or replacement of one of the modules.

In fact, the use of coaxial leaf-spring contacts (for example, Radsock® type) perfectly integrated into the casing of the interconnection block and the terminals of the modules provides for stacking of the storage means, offering a great gain in space and better quality, protection and reliability of the connections. A specific tightening torque needed for traditional screws is advantageously avoided, along with all bulky screws or cables, since plugging the interconnection block to the terminal strip of the modules is itself self-locking.

Interconnection blocks are thus used electrically to link the respective terminals of several juxtaposed or stacked modules. Termination blocks are used at the beginning and end of a chain of modules thus produced. These blocks are typically constituted so as to provide for easy plugging between the different terminals of the modules by means of axial connections and guides which facilitate alignment and constitute, once the modules and interconnection blocks are assembled, a self-locking device.

Generally, the terminals are isolated and thus electrically protected from the casing constituting the module, the interconnection block and the termination block.

An interconnection block is made up of at least one pair of terminals either with an electrical cross-connection or with a straight connection so as to electrically connect at least one terminal of each of the juxtaposed or stacked modules. If the interconnection block forms an electrical connection between terminals of the same polarity between two modules, the interconnection block is said to be of the "straight" type. If the interconnection block forms an electrical connection between terminals of inverse polarity between two modules, the interconnection block is said to be of the "cross" type. Thus, it is possible to produce a parallel or series assembly between several juxtaposed or stacked modules through the use of several straight and/or cross interconnection blocks.

A termination block is made up of at least one terminal connected electrically on one side to at least one of the terminals of the module and on the other to a terminal strip which could be specific to the requirements of the application thus forming the end of an electrical chain of such an assembly.

The interconnection block and the termination block have the particular feature of being able to integrate at least one safeguard by means of a protective fuse between each pair of terminals and monitoring electronics to measure, among other things, the temperature, voltage and current of each module and to transmit this information over a continuous bus comprising the assembly chain of modules thus connected.

The interconnection block may also comprise means of connection between modules of the coaxial spring type.

Advantageously, the interconnection block can be oriented with respect to the terminal strip of modules to provide for stacking and/or juxtaposition of the modules. It is thus possible to produce very flexible assemblies, which are therefore suitable for an imposed and limited infrastructure, above all like that in vehicles.

There are also cooling elements for each module, using a liquid cooling circuit, said circuit being planar and in direct contact with at least one face of each module. In the case of stacking of several modules, a cooling element is also in contact with a face of the adjacent module.

An energy storage means cooling plate can easily be integrated with a lower or upper face of the module and provides for the extraction of heat by conduction both for said means itself and for the adjacent storage means in the case of stacking. The thickness of the cooling plate may be different in order to meet different cooling requirements. Similarly, the interconnection blocks, terminal strips and internal connections may be easily modified by adjusting the dimensions to overcome new geometric constraints.

The proposed cooling device has self-sealing and polarized connectors which facilitate the assembly of the modules and rapid assembly and dismantling of the circuit without necessitating drainage or special tools, while presenting minimal risk of leakage.

A set of sub-claims also presents advantages of the invention.

Examples of embodiments and applications are provided using the following figures:

DESCRIPTION OF THE INVENTION

Figure 1A:
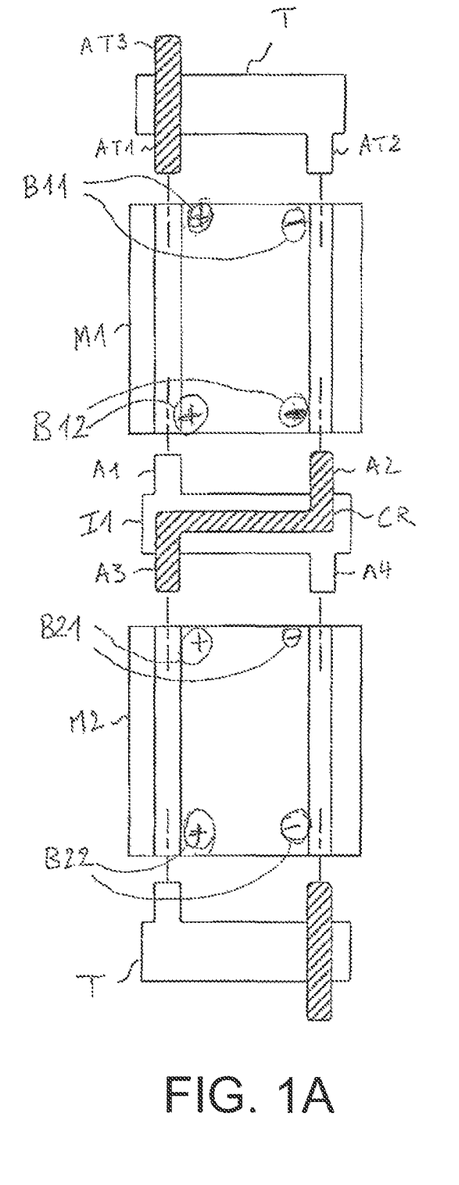
FIGS. 1A, 1B Systems for assembling two modules as energy storage means in series or in parallel according to the invention, FIG. 2 System for assembling in series two juxtaposed stacks of two modules according to the invention, FIGS. 3A, 3B Possibilities for the assembly system according to FIG. 1(a) without and with interposed cooling modules, FIGS. 4A, 4B Possibilities for the assembly system according to FIG. 1(a) with interconnection modules integrally adjoining the cooling modules or sliding freely with respect to the cooling modules, FIGS. 5A, 5B Interconnection block and system for assembling in parallel two juxtaposed modules according to the invention, FIGS. 6A, 6B Interconnection block and system for assembling in series two juxtaposed modules according to the invention, FIGS. 7A, 7B, 7C Interconnection block and two configurations of the system according to FIG. 5B with and without said block.
Figure 1B:
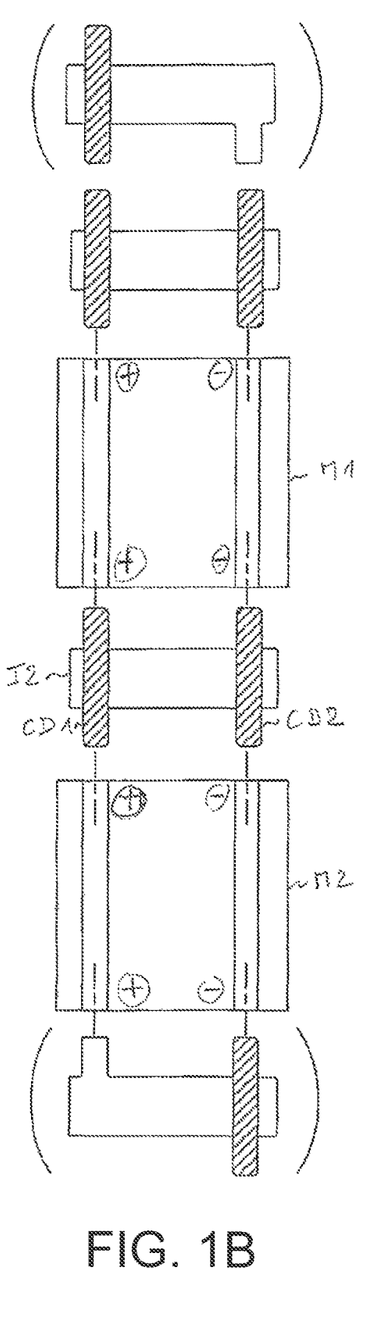

FIGS. 1A, 1B each present a system for assembling two modules (such as two energy storage means like a battery, a super-capacitor) electrically connected in series (a) or in parallel (b) according to the invention.

Said assembly system thus comprises here two modules (M1, M2), each of them having two pairs of terminals, one positive and one negative (+, −). The system provides that:

each of said pairs of positive and negative terminals (B11, B12; B21, B22) is distributed on one of the faces of a terminal strip of each module (M1, M2), at least one interconnection block (I1) can be inserted between the two integral terminal strips of each of the two separate modules and itself comprises two pairs of terminals (A1, A2; A3, A4) so as to form a stacked block of said modules (M1, M2), at least one of the pairs of terminals of the interconnection block is in electrical contact with the terminal strip of each of the stacked modules, the remaining pair of terminals can be made up of an electrically insulating material in order to contribute only mechanical stress and rigidity to the stack.

For the configuration with electrical connection in series according to FIG. 1A, two terminals (A2, A3), each located on one of the opposite faces of the interconnection block, are linked by a geometrically crossed conductor (CR) integrated into said block in order to connect (in series) a positive terminal (B21, +) of one of the modules (M2) to a negative terminal (B12, −) of the other module (M1). Since the interconnection block thus presents four anchoring points to the modules, each of the pairs of terminals (female opening) of the terminal strip can be integrally plugged by the anchoring points (male pins).

For the configuration with electrical connection in parallel according to FIG. 1B, the four anchoring points, each located on one of the opposite faces of the interconnection block, are linked in pairs by a geometrically straight conductor (CD1, CD2) in order to connect the terminals of one of the modules (M2) to the terminals of the other module (M1), the terminals connected being of the same polarity.

For these two configurations, at the (here upper) end of the stack of a set of modules and, by extension, at least at one of the ends of the assembly, a termination block (T) can also be stacked and comprises:

- on a first of its faces, two anchoring means (AT1, AT2) on the pluggable positive and negative terminals (B11) located on an external/upper face of the last stacked storage means module (M1),
- and a contact terminal (AT3) linked electrically to one of the anchoring means, this contact terminal ideally comprising a metal screwed, soldered or crimped element or another means of connection to an electrical power supply circuit specific to the needs of the application.

A second termination block (T) may also be stackable on the other (here lower) end of the stack of a set of modules.

Thus, the termination blocks, the interconnection block(s) and the various modules are easily integrated in the form of a monobloc column.

In the case of mass transport vehicles, these stacks can be easily placed in a box and their constituent elements can, if necessary, easily be removed/replaced by simple sliding or stacking, depending whether they are placed horizontally or vertically.

Figure 2:
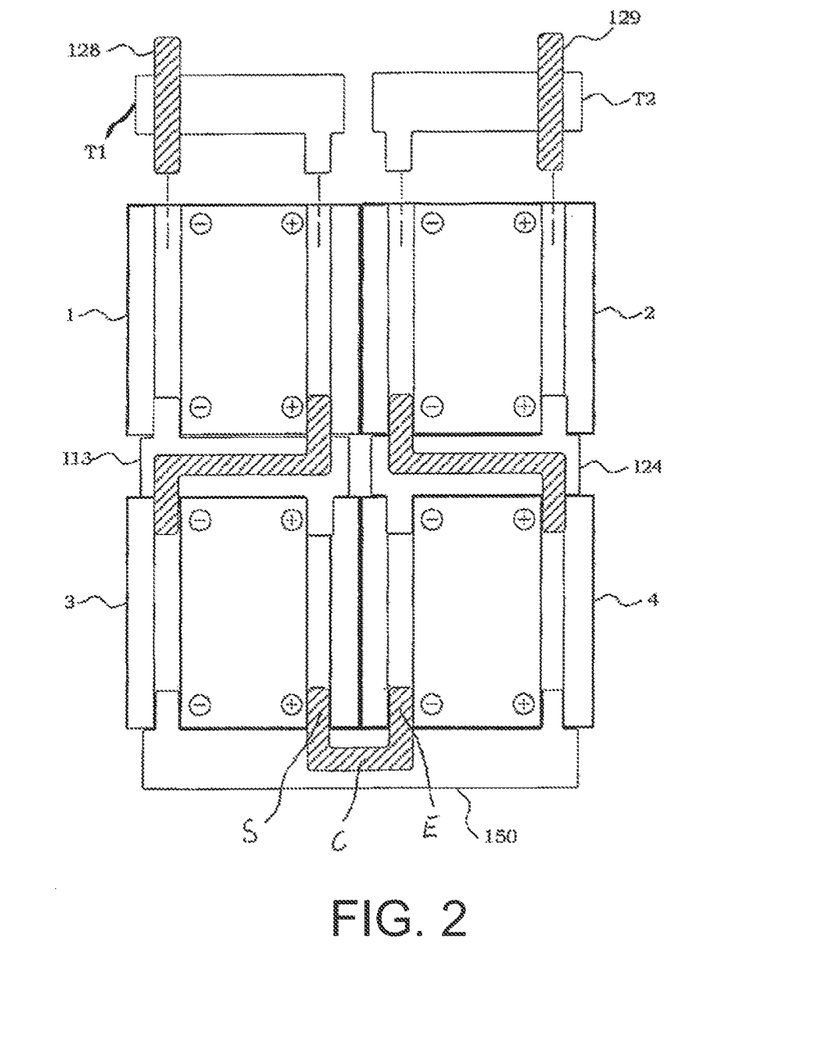

FIG. 2 presents a system for assembling in series two juxtaposed stacks, each comprising two modules (1, 3; 2, 4) according to the invention. Each of these two stacks comprises here two modules assembled and connected in series according to the system in FIG. 1(a). The first stack thus comprises a termination block (T1) with an electrical input terminal (128) which can be plugged mechanically using two anchoring points into the terminals (−/+) of the upper face of the first module (1), itself connected to the second module (3) by means of an interconnection block (I13) for electrical connection in series. The second stack is symmetrical with the first stack and also comprises a termination block (T2) with an electrical output terminal (129) which can be anchored mechanically by means of two anchoring points in the terminals (−/+) of the upper face of the third storage means (2), itself connected to the fourth storage means (4) by means of an interconnection block (124) for electrical connection in series. An additional interconnection block (150) linking the positive output (S) terminal (+) of the first stack and the negative input (E) terminal (−) is located beneath the two lower faces of the two stacks, thus forming a base for integration of the latter. An electrical conductor (C) is integrated into the additional interconnection block (150), the two ends of which also form anchoring points (by plugging) to a terminal of each lower module of the first and second stack. The additional interconnection block (150) here provides for electrical connection in series of the two stacks. In the case of connection in parallel, as in FIG. 1(b), a parallel connection of the two stacks would also have been possible by integrating two conductors into the additional interconnection block (150), each anchoring and linking the terminals of the same polarity of the modules in the lower part of the stacks.

To sum up, a system with juxtaposed stacks can thus also be produced, wherein at least four modules (1, 2, 3, 4) as storage means are arranged in two vertical and juxtaposed stacks, where:

- two storage means (3, 4) at each base of the stacks are integrated with their said bases by a conducting element (C) linking just one of the terminals of one of the two modules (3) to just one terminal with inverse polarity of the other module (4), this conducting element being encapsulated in an additional interconnection block (150) forming a base to support and integrate the two stacks,
- two interconnection blocks (113, 124) are located between each pair of stacked storage means (1, 3; 2, 4).

In particular, with regard to the configuration with two juxtaposed stacks described in, for example U.S. Pat. No. 5,378,552, the number of connection elements is considerably reduced, since, in particular, thanks to the interconnection modules according to the invention, "back-and-forth" electrical connections across the actual modules is avoided and also, unlike this invention, the assembly of modules in parallel does not seem to be possible.

Figures 3A, 3B:
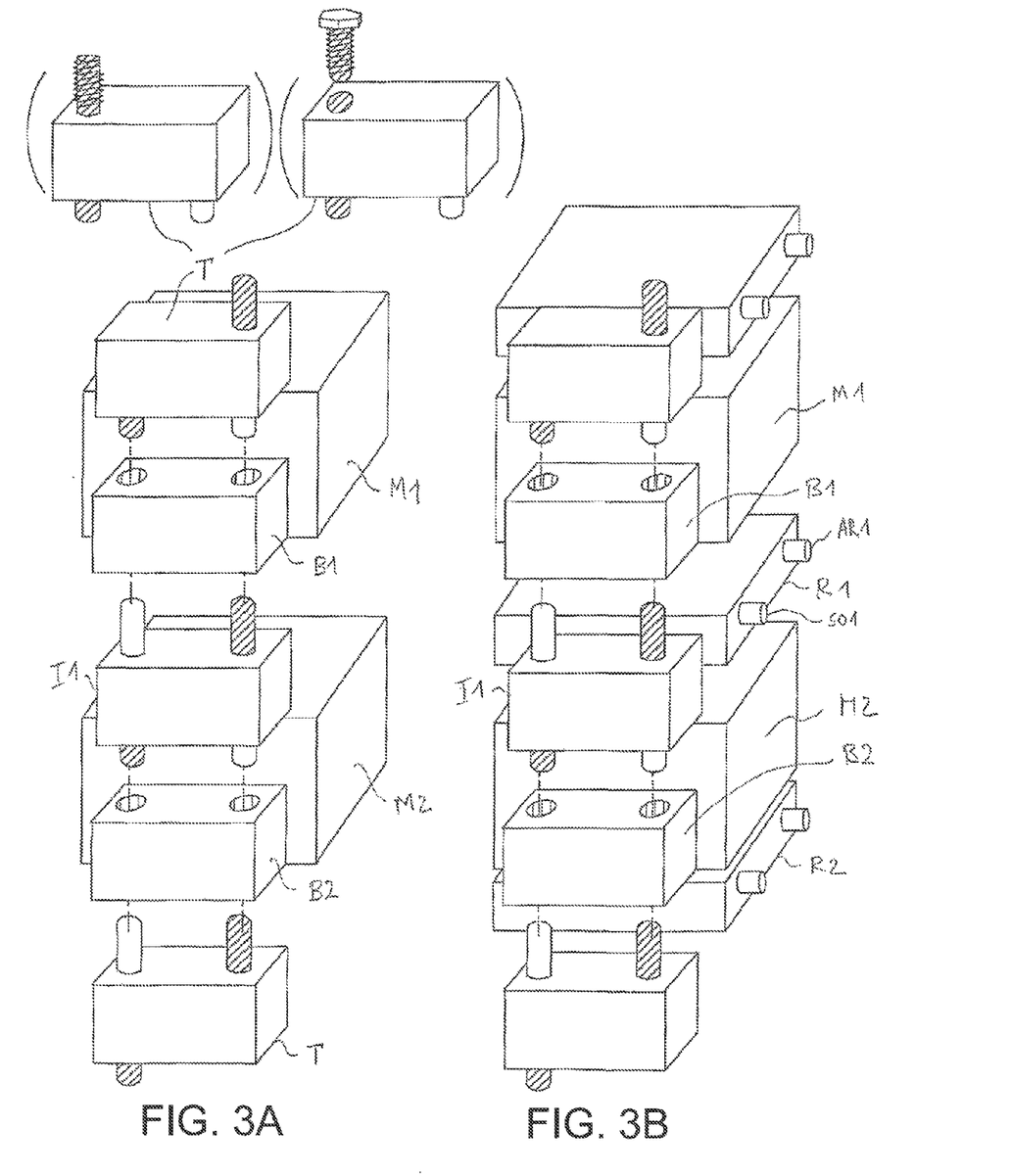

FIGS. 3A, 3B present two possibilities for the assembly system according to FIG. 1A without and with cooling modules interposed between the energy storage modules (in order to cool the latter).

According to the embodiment in FIG. 3A without cooling modules, the anchoring points of the interconnection block (I1) can be plugged onto the energy storage modules (M1, M2) by means of at least one block (B1, B2) laterally adjoining each block formed by an (energy storage) module and with upper and lower surfaces comprising respectively a pair of terminals connected to the terminals of said module and suitable for being coupled to the anchoring points of said interconnection block. More generally and in the case of all the figures, the anchoring points of the interconnection block (I1) can be plugged onto the modules (M1, M2) by means of at least one terminal strip (B1, B2) integrated with at least one of the faces of each module comprising respectively a pair of positive terminals and a pair of negative terminals linked electrically with internal primary elements of the module and suitable for being coupled to the anchoring points.

The ideal dimensions of the stacking elements is such that an adjoining block (B1) and an interconnection block (I1) form a stack with a depth at least equal to a depth of the storage means (M1).

In this configuration, the stack is therefore simply integrated by assembling a column of adjoining blocks alternating with identical interconnection modules.

In the upper part of FIG. 3A, two termination blocks (T) have been represented to show that the electrical input terminal (to connect the stack to a source of electricity) can be a screw element or a simple internal thread to accept a bolt.

According to the embodiment in FIG. 3B as an additional alternative to FIG. 3A, planar cooling modules (R1, R2) with a surface identical to those of the lower and upper faces of the modules (M1, M2) are located between said energy storage modules.

With these cooling modules, the ideal dimensions of the stacking elements are such that an adjoining block (B1) and an interconnection block (I1) form a stack with a depth at least equal to a depth of the module (M1) and of a cooling element (R1) located on one of the module stacking faces.

Cooling liquid inlet and outlet paths (AR1, SO1) can be arranged laterally to the cooling modules (R1), on one side of the stack lateral to the adjoining blocks and to the interconnection blocks.

More generally and applying to all embodiments of the system according to the invention, it is thus provided that:

- the interconnection block comprises means for accepting at least one cooling element (R1, R2), ideally making it possible firmly to position (mechanically) said element on one of the faces of one of the modules (M1, M2).
- even though not represented in FIG. 3B, the interconnection block (and, if necessary, the adjoining block or terminal strip as in FIG. 3B) comprises a circuit with at least one cooling liquid transfer duct between cooling element inlets and outlets (R1, R2).

Figure 4A:
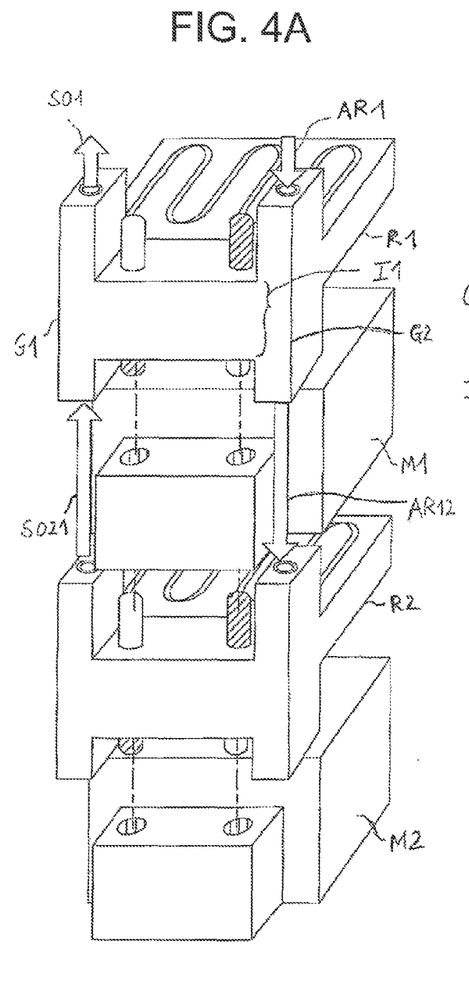
Figure 4B:
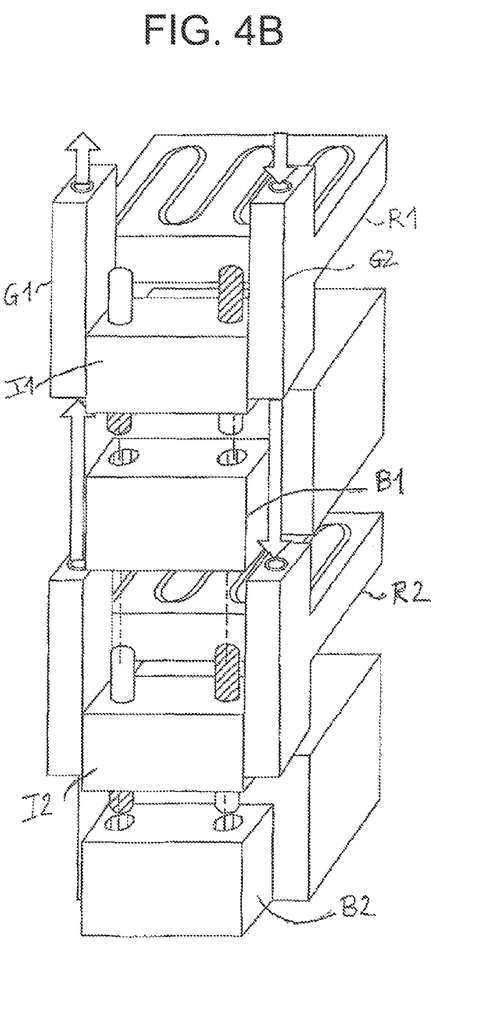

FIGS. 4A, 4B present two possibilities for the assembly system according to FIG. 3B with, however, interconnection blocks (I1), each integrally adjoining a cooling module (R1) according to FIG. 4A or sliding freely with respect to the cooling modules (R1) according to FIG. 4B.

Principally, for the two FIGS. 4A and 4B, each cooling element (R1) includes cooling liquid inlet (AR1) and outlet (SO1) paths integrated into two guides (G1, G2) encapsulating two lateral faces of an adjoining block (B1) and of an interconnection block (I1).

In the case of FIG. 4A, the encapsulation of the interconnection block (I1) is such that the interconnection block (I1), the cooling element (R1) and the guides form a monobloc. Only the adjoining modules slide in to be encapsulated between the guides until they abut against a face of the interconnection block.

In the case of FIG. 4B, the encapsulation of the interconnection block (I1) is such that only the cooling element (R1) and the guides form a monobloc. The interconnection block (I1) is then sliding between the guides in the same way as the adjoining blocks (B1, B2).

The guides integrate the inlet (AR1) and outlet (SO1) paths of each cooling module according to the direction of the stack on the side of the adjoining modules and interconnection blocks. The dimensions of the guides are such that the cooling liquid flows (AR12, SO21) between two consecutive cooling modules (R1, R2) are provided with no discontinuity between them (in a sealed manner through the use of connectors of the self-sealing type) while remaining at least equal to the depth of an adjoining module and an interconnection block. A circuit with a single cooling liquid inlet and a single outlet may thus be sufficient to channel the flows of liquid along all the stacked cooling modules. A flow shutoff (not represented) is then possible at the (lower) termination of the stack by inserting an interface specific to the requirements of the application on two of the four liquid inlets/outlets in each guide.

The preceding figures represent assemblies in stacks of modules according to the invention. Analogously, it is also possible to configure an assembly by juxtaposition of modules in which case an interconnection block and its anchoring points are plugged into the terminals of the modules.

More generally and applying to all embodiments of the system according to the invention, it is thus provided that:
- the interconnection block comprises means for accepting at least one cooling element (R1, R2), ideally making it possible firmly to position (mechanically) said element on one of the faces of one of the modules (M1, M2). In FIG. 4A, these accepting means are also integrated with the guides of the cooling element, thus forming a monobloc.
- even though this is not the case in FIGS. 4A, 4B, the interconnection block (and, if necessary, the adjoining block or terminal strip as in FIGS. 4A, 4B) may comprise a circuit with at least one cooling liquid transfer duct between cooling element inlets and outlets (R1, R2).
- in the case of FIGS. 4A, 4B, a first cooling element (R1) highly advantageously comprises a cooling liquid circulation circuit (G1, G2) peripherally encapsulating the interconnection block (I1) in order to provide for circulation of said liquid with a second cooling element (R2). This structure combines easy assembly or dismantling and provides a mechanically and electrically stable assembly. Furthermore, the interconnection block (I1), the cooling element (R1), the terminal strip (B1) and the guides (G1, G2) form sealed connections protected from the environment, ideally by means of self-sealing connectors.
- for FIGS. 3A, 3B, 4A, 4B, a terminal strip (B1) and an interconnection block (I1) thus form a vertical or horizontal stack with a depth at least equal to a depth of the storage means module (M1) and, if present, of the cooling element (R1) located on one of the faces of the storage means module assembly.

Figure 5A:
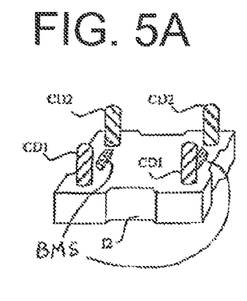
Figure 5B:
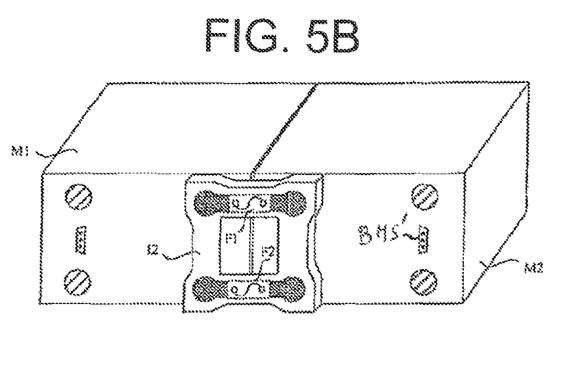

FIGS. 5A, 5B represent respectively an interconnection block (I2) and a system for assembling in parallel two modules (M1, M2) assembled in a juxtaposed manner (as a variant, in addition to stacking) according to the invention.

The interconnection block (I2) comprises four anchoring points (CD1, CD2, CD3, CD4), one pair of which is plugged into one of the pairs of the terminal strip on the edge of the first module (M1) and a second pair is plugged into one of the pairs of the terminal strip on the edge of the second module (M2), each of the edges being capable of being placed side by side for juxtaposition. The pairs of linked terminals of each module thus form two separate straight circuits and may each be fitted with fuse type protection (F1, F2). The interconnection block (I2) also comprises and integrates two plugs (BMS) suitable for the transmission of signals coming from or going to an electrical module for monitoring (voltage at the terminals, temperature of a module, etc.) the assembly and/or the balance of the electrical characteristics of the assembled modules. Each of these plugs (BMS) (here male on the interconnection block) is plugged into an appropriate plug (BMS') (here female on each of the modules) close to the edge of each of the modules, thus producing an inter-module bridge for said signals. This avoids chains of cables between plugs. These plugs can also be integrated in FIGS. 1 to 4, even though not represented. Juxtaposition is advantageously well held and stiffened by means of four mechanical anchoring points (CD1, CD2, CD3, CD4) and conductors in straight pairs (connection in parallel) of the interconnection block.

Figure 6A:
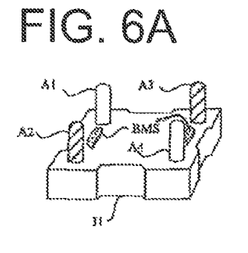
Figure 6B:
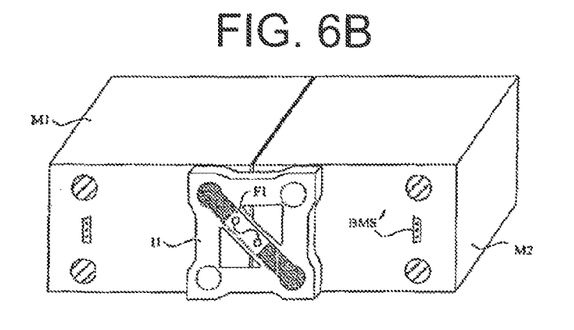

FIGS. 6A, 6B represent respectively an interconnection block and a system for assembling in series two modules assembled in a juxtaposed manner (as a variant, in addition to stacking) according to the invention. In principle, the plugging and juxtaposition are identical to those in FIGS. 5A, 5B. The difference lies in the fact that only a pair of linked terminals of each module forms a cross-circuit via the anchoring point conductors (A2, A3), itself protected by a single fuse (F1). The juxtaposition is, however, still held and stiffened by means of the four mechanical anchoring points (A1, A2, A3, A4) of the interconnection block, two of which are conductors in crossed configuration.

Figure 7A:
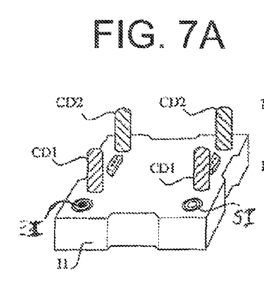
Figure 7B:
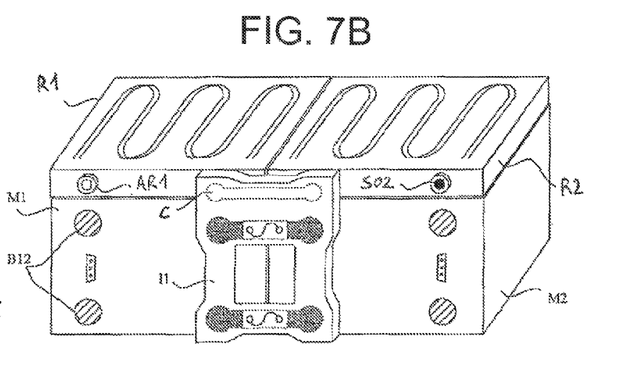
Figure 7C:
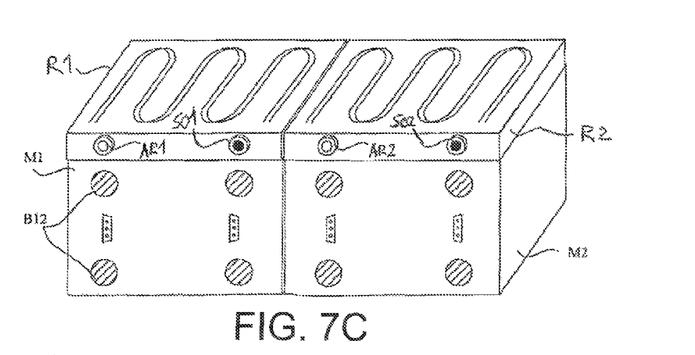

FIGS. 7A, 7B, 7C represent an interconnection block (I1) and two configurations of the system according to FIG. 5B (or analogously FIG. 6B) with and without said block. Unlike FIG. 5B, a flat cooling element (R1, R2) is respectively located on the upper face of each module (M1, M2). The cooling elements (R1, R2) each comprise laterally (in the plane of the terminal strip (B12) of the subjacent module) a cooling liquid inlet (AR1, AR2) and outlet (SO1, SO2). In these Figures, the interconnection block has an inter-module cooling liquid transfer circuit using a duct (C) linking an outlet from a module with an inlet to the other module. The duct (C) comprises, according to FIG. 7A, an inlet (EI) and an outlet (SI) (elements with joints or self-seals) integrated on the termination face of the interconnection block and linked by a channel internal to said block. FIG. 7B thus illustrates that, in inserted position, the interconnection block (I1)

couples the modules electrically and mechanically and also couples the two cooling elements in a sealed manner and also integrates them mechanically.

Finally, the assembly system according to the invention and all its embodiments provide that:

- the interconnection block may include fuse protection on at least one of its electrical terminals, ideally in the form of a fuse bridge, advantageously detachable, between two of the terminals of the interconnection block. This provides for easier maintenance in the event of an electrical problem (short-circuit and fuse change).
- the interconnection block may be fitted with monitoring electronics linked to the assembled modules (M1, M2) by means of integrated plug-connectors, such as the plugs (BMS, BMS') illustrated in FIGS. 5 to 7 but able to be integrated for all the other embodiments, or by means of coding (modulated electrical carrier) through the terminals on the anchoring points. Thus, the modules may contain only simpler or more basic, and therefore more easily interchangeable, storage means.
- the interconnection block may be fitted with means of balancing the electrical characteristics of the assembled modules.
- the interconnection block has anchoring point positioning geometry suitable for stacking and/or juxtaposition of modules assembled linearly or orthogonally. This facilitates arrangement of the modules in a restricted or angular infrastructure, as may be the case in optimized environments such as vehicles.
- the anchoring points of the interconnection block number 4, 5, 6, 7 or 8 depending on whether stacking and/or juxtaposition of the modules is desired and depending on the geometry of the module terminal strips. Thus, the interconnection block can be adapted to multiple terminal strip or storage means standards.
- if possible, the interconnection block may include means of connection between modules, ideally of the coaxial or leaf spring type.
- a storage means module comprises at least one supercapacitor and/or a battery, for example as for the energy requirements of a railway type vehicle.

The invention claimed is:

1. A system for assembling storage devices, the system comprising:
   electrical energy storage modules each having external faces and two pairs of positive and negative terminals;
   each of said pairs of positive and negative terminals being distributed over at least one of said external faces of each of said storage modules forming a terminal strip of said storage module;
   at least one interconnection block configured to be inserted onto part of each of said terminal strips of a separate two of said storage modules and said at least one interconnection block including at least two pairs of anchoring points configured to form an assembly block by stacking or by juxtaposing said storage modules; and
   at least two of said anchoring points of each said at least one interconnection block being in electrical contact with said terminal strip of each of said stacked modules and stiffening an assembly of said storage modules in a manner complementary to others of said anchoring points;
   each said at least one interconnection block having opposite faces with said at least two anchoring points located thereon.

2. The system according to claim 1, wherein two of said anchoring points of said at least one interconnection block are electrically connected to link one of said positive terminals of one of said storage modules to one of said negative terminal of another of said storage modules to form a cross interconnection block.

3. The system according to claim 1, wherein four of said anchoring points of said at least one interconnection block are electrically connected in pairs to link said terminals with the same polarity of one of said storage modules to another of said storage modules to form a straight interconnection block.

4. The system according to claim 1, which further comprises:
   a stacked set of said storage modules having assembly ends and a last stacked storage module; and
   a termination block configured to be stacked on at least one of said assembly ends, said termination block including two anchoring devices on said positive and negative terminals of said last stacked storage module and a positive or negative termination contact terminal linked electrically to one of said anchoring devices.

5. The system according to claim 4, wherein said termination contact terminal includes a metal screwed, soldered or crimped element.

6. The system according to claim 1, which further comprises:
   two vertical and juxtaposed stacks of at least four of said storage modules, said stacks having bases;
   a conducting element integrating two of said storage modules at each of said bases of said stacks with said bases of said stacks and linking just one of said terminals of one of said storage modules to just one of said terminals with inverse polarity of another of said storage modules; and
   said at least one interconnection block including two interconnection blocks each disposed between a respective pair of said stacked storage modules.

7. The system according to claim 1, which further comprises at least one terminal strip plugging said anchoring points of said at least one interconnection block into said storage modules, said at least one terminal strip being integrated with at least one of said faces of each of said storage modules including a respective pair of said positive terminals and a respective pair of said negative terminals linked electrically with primary internal elements of said storage module and being configured for coupling with said anchoring points.

8. The system according to claim 1, which further comprises at least one cooling element to be accepted by said at least one interconnection block.

9. The system according to claim 8, wherein said at least one cooling element is securely placed on one of said faces of one of said storage modules.

10. The system according to claim 8, wherein said at least one cooling element has at least one inlet and at least one outlet, and said at least one interconnection block includes a circuit with at least one cooling liquid transfer duct between said at least one inlet and said at least one outlet.

11. The system according to claim 8, wherein said at least one cooling element includes first and second cooling elements, said first cooling element has a cooling liquid circulation circuit peripherally encapsulating said at least one interconnection block to provide for circulation of a liquid with said second cooling element.

12. The system according to claim 8, which further comprises a terminal strip forming, with said at least one interconnection block, a vertical or horizontal stack with a depth at least equal to a depth of said storage module and of said at least one cooling element disposed on one of said external faces of said storage module.

13. The system according to claim 12, wherein each said at least one cooling element includes cooling liquid inlet and outlet paths integrated into two guides encapsulating two lateral faces of an adjoining terminal strip and said at least one interconnection block.

14. The system according to claim 13, wherein said at least one interconnection block, said at least one cooling element and said guides form a monobloc and said at least one interconnection block slides between said guides.

15. The system according to claim 13, wherein said at least one interconnection block, said at least one cooling element, said at least one interconnection block and said guides form a monobloc.

16. The system according to claim 13, wherein said at least one interconnection block, said at least one cooling element, said terminal strip and said guides form a sealed connection protected from the environment.

17. The system according to claim 16, wherein said sealed connection uses self-sealing connectors.

18. The system according to claim 17, wherein said at least one interconnection block has a number of said anchoring points selected from the group consisting of 4, 5, 6, 7 and 8.

19. The system according to claim 1, which further comprises a terminal strip forming, with said at least one interconnection block, a vertical or horizontal stack with a depth at least equal to a depth of said storage module.

20. The system according to claim 1, wherein said at least one interconnection block includes electrical terminals and fuse protection on at least one of said electrical terminals.

21. The system according to claim 20, wherein said fuse protection is in the form of a detachable fuse bridge between two of said electrical terminals of said interconnection block.

22. The system according to claim 1, which further comprises integrated plug-connectors, said at least one interconnection block being fitted with monitoring electronics linked to said assembled storage modules by said integrated plug-connectors or by coding through said terminals at said anchoring points.

23. The system according to claim 1, wherein said at least one interconnection block balances electrical characteristics of said assembled storage modules.

24. The system according to claim 1, wherein said at least one interconnection block has an anchoring point positioning geometry suitable for stacking and/or juxtaposition of said storage modules assembled linearly or orthogonally.

25. The system according to claim 1, wherein said at least one interconnection block includes a connection between said storage modules.

26. The system according to claim 25, wherein said connection is of a coaxial or leaf-spring type.

27. The system according to claim 1, wherein said storage module is at least one super-capacitor or battery.

\* \* \* \* \*